United States Patent
Josset et al.

(10) Patent No.: US 7,991,993 B2
(45) Date of Patent: Aug. 2, 2011

(54) TELECOMMUNICATION SYSTEM, FOR EXAMPLE AN IP TELECOMMUNICATION SYSTEM, AND EQUIPMENT UNITS FOR USE IN THE SYSTEM

(75) Inventors: Sébastien Josset, Toulouse (FR); Laurence Duquerroy, Toulouse (FR)

(73) Assignee: Alcatel Lucent, Paris (FR)

( * ) Notice: Subject to any disclaimer, the term of this patent is extended or adjusted under 35 U.S.C. 154(b) by 1207 days.

(21) Appl. No.: 10/403,083

(22) Filed: Apr. 1, 2003

(65) Prior Publication Data

US 2003/0188159 A1 Oct. 2, 2003

(30) Foreign Application Priority Data

Apr. 2, 2002 (FR) .................................. 02 04088

(51) Int. Cl.
H04L 9/00 (2006.01)
(52) U.S. Cl. ........................................ 713/153; 713/163
(58) Field of Classification Search .................. 713/163, 713/153, 154, 162; 380/270, 278, 279; 719/328; 726/12
See application file for complete search history.

(56) References Cited

U.S. PATENT DOCUMENTS

| | | | | |
|---|---|---|---|---|
| 6,073,235 A * | 6/2000 | Foladare et al. | ............... | 713/163 |
| 6,178,453 B1 * | 1/2001 | Mattaway et al. | ............ | 709/227 |
| 6,195,751 B1 * | 2/2001 | Caronni et al. | ............... | 713/163 |
| 6,215,877 B1 * | 4/2001 | Matsumoto | .................... | 380/277 |
| 6,606,706 B1 * | 8/2003 | Li | .................................. | 713/162 |
| 6,629,243 B1 * | 9/2003 | Kleinman et al. | ............. | 713/163 |
| 2002/0069369 A1 * | 6/2002 | Tremain | ......................... | 713/201 |
| 2003/0163690 A1 * | 8/2003 | Stewart | ......................... | 713/163 |

FOREIGN PATENT DOCUMENTS

WO    WO 9909707    2/1999
WO    WO 02/11356 A2    2/2002

OTHER PUBLICATIONS

F. Jordan et al, "Secure Multicast Communications Using a Key Distribution Center", Information Networks and Data Communication. Proceedings of the IFIP TC6 International Conference on Information Networks and Data Communication, Funchal, Madeira Island, Portugal, Apr. 18-21, 1994, Proceedings of the IFIP TC6 International Conference, vol. CONF. 5, Apr. 18, 1994, pp. 367-380, XP000593303.

Andrew S. Tanenbaum, "Computer Networks", 1996, Computer Networks, Englewood Cliffs, Prentice Hall, US pp. 212-239, XP002079137.

* cited by examiner

Primary Examiner — Hosuk Song
Assistant Examiner — Edward Zee
(74) Attorney, Agent, or Firm — Sughrue Mion, PLLC

(57) ABSTRACT

The invention relates to a telecommunication system including a plurality of terminals divided into groups such that within each group each terminal can send multidestination messages to the other members of the group. Each terminal of a group is associated with encryption and decryption means so that each terminal can send multidestination messages that can be decrypted only by the other terminals of the group. The system includes a central server for distributing to each encryption and decryption means keys for secure transmission of communications within each group.

35 Claims, 3 Drawing Sheets

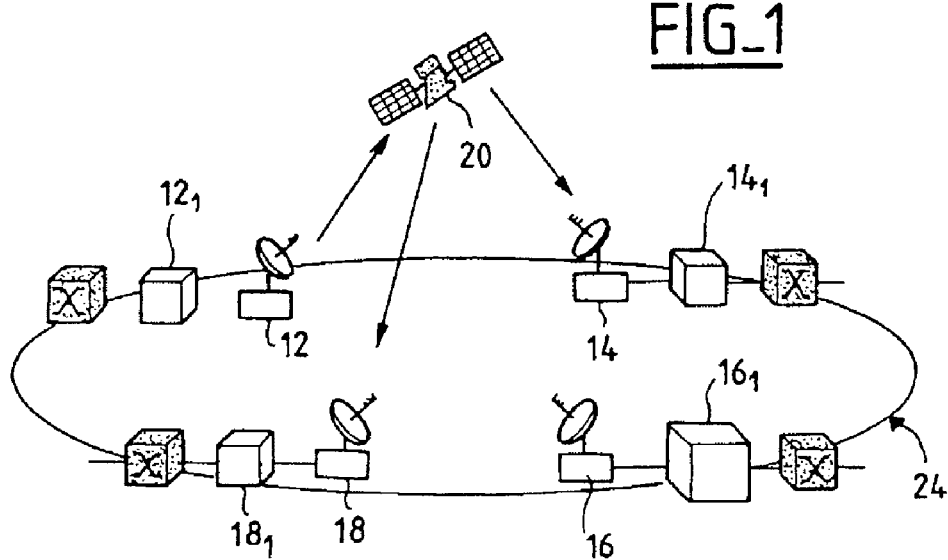
FIG_1
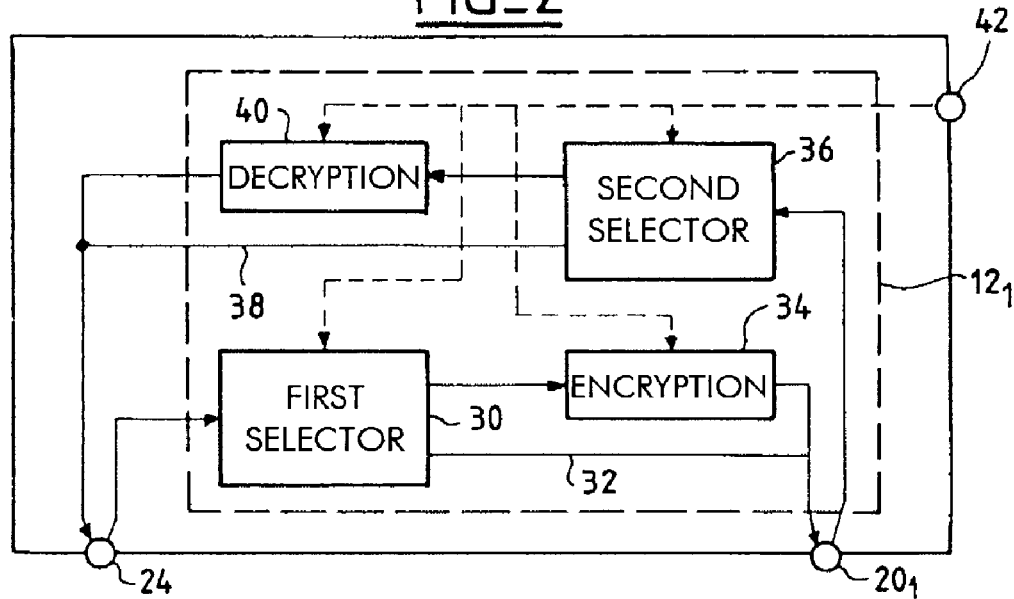
FIG_2
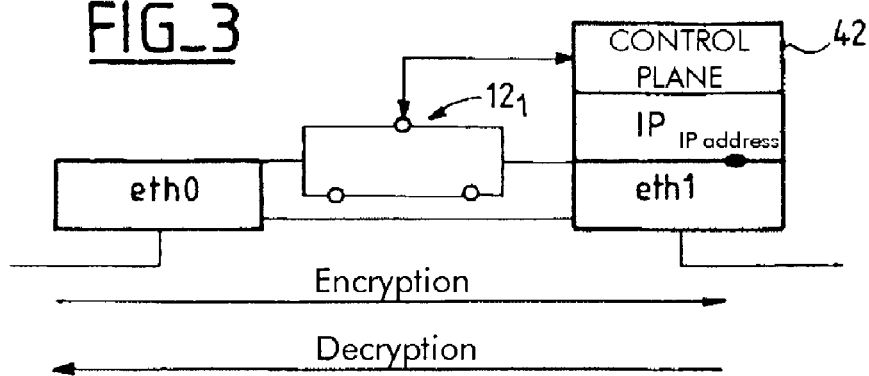
FIG_3

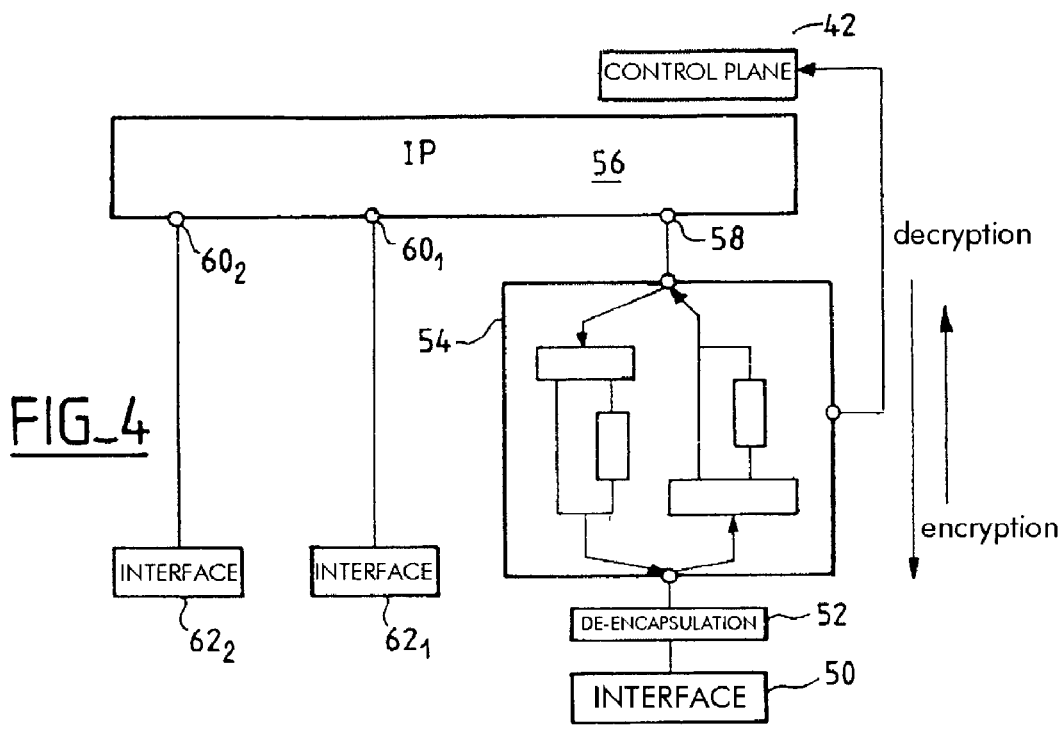
FIG_4
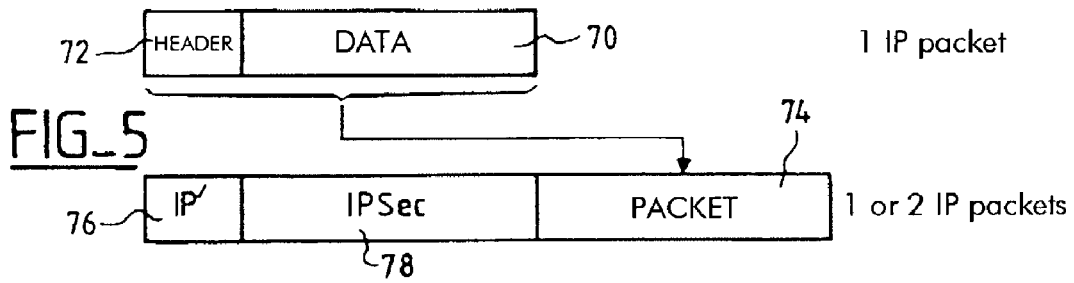
FIG_5
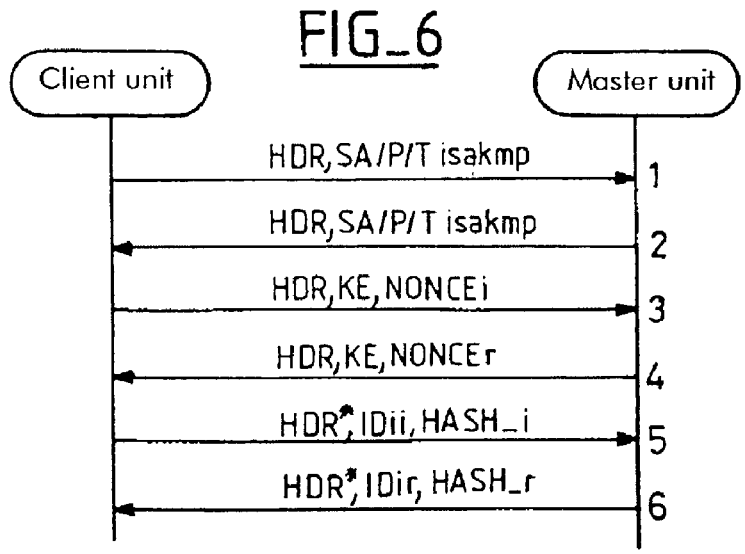
FIG_6

FIG_7
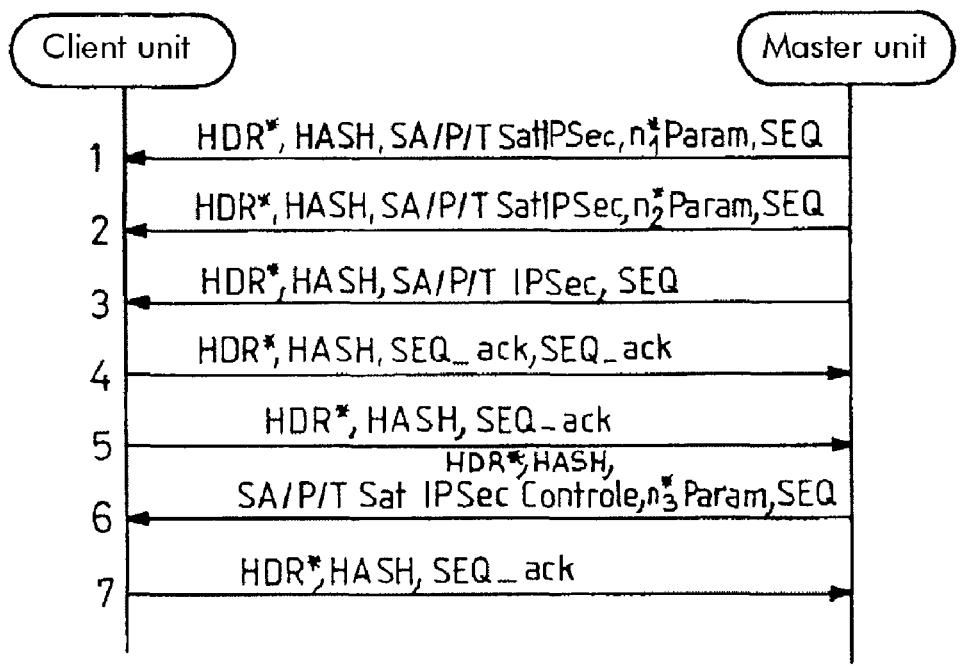
FIG_8
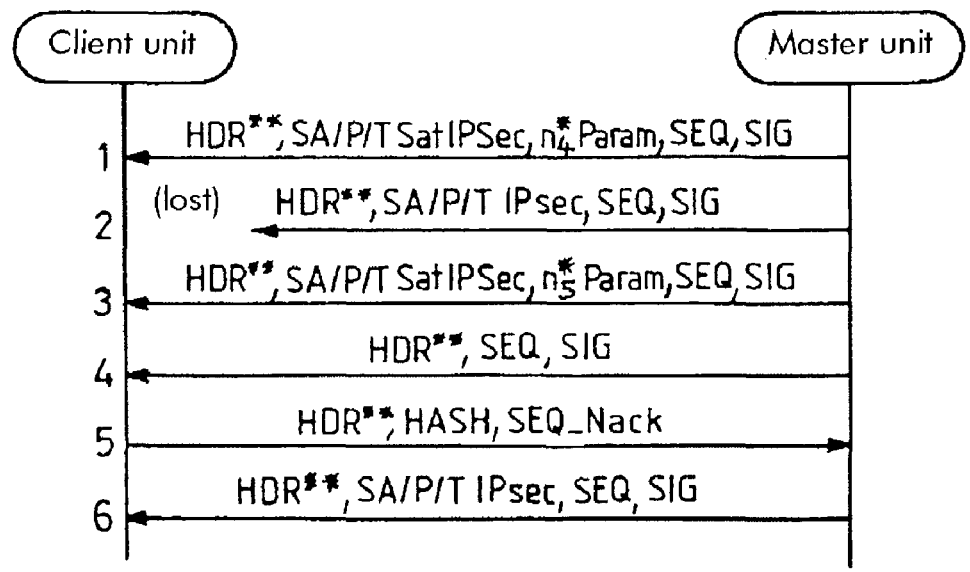

TELECOMMUNICATION SYSTEM, FOR EXAMPLE AN IP TELECOMMUNICATION SYSTEM, AND EQUIPMENT UNITS FOR USE IN THE SYSTEM

CROSS-REFERENCE TO RELATED APPLICATIONS

This application is based on French Patent Application No. 02 04 088 filed Apr. 2, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to a telecommunication system, for example an Internet Protocol (IP) telecommunication system, and to equipment units for use in the system.

It relates more particularly to a telecommunication system in which some terminals form groups and one terminal in each group can send all the other terminals messages such as IP packets that must not be understandable by the terminals in the other groups.

2. Description of the Prior Art

To be sure of solving this problem, the messages are usually encrypted. To this end, algorithms and keys are negotiated between the terminals two by two. In other words, a secure message can be sent to only one addressee and not to a plurality of addressees simultaneously. This being so, if a group comprises n terminals, each message must be sent n−1 times.

This proliferation of secure messages to be sent increases the traffic and can saturate the network. Furthermore, the sessions that set up secure links between the terminals two by two can also increase the traffic.

The invention eliminates these drawbacks.

SUMMARY OF THE INVENTION

The system according to the invention includes a central server for distributing to all the terminals of a group encryption and decryption keys so that each terminal of the group can send to the other terminals of the group a single encrypted message and the addressee terminals can decrypt the message sent in this way.

Thus, according to the invention, sending secure multidestination messages does not necessitate sending the same number of encrypted messages as there are addressees, and this therefore minimizes the traffic.

The invention is particularly beneficial for wireless transmission using terrestrial antennas or equipment units on board one or more satellites. Broadcasting information in this way has the advantage of serving a multiplicity of terminals, in particular, in the case of satellite broadcasting, terminals that are far apart.

However, data transmission means of the above kind are more difficult to protect against indiscretions than terrestrial cable networks because, in a cable network, the cables must be accessed to intercept information, whereas with wireless transmission any terminal in the field of the corresponding antenna is capable of intercepting the information transmitted. Similarly, an unauthorized sending terminal can be inserted into the network.

It is therefore preferable to transport information, for example IP packets, in secure mode, as is the case with the invention.

The invention is primarily described hereinafter with reference to networks transmitting IP packets via equipment units on board satellites, although the invention is not limited to such applications. There are various protocols for secure transportation of IP packets. Security is implemented at the physical level, for example by frequency hopping, at the access level, for example by scrambling, or at the IP level, using the Internet Protocol Security (IPSec) protocol, or at the transport level, using the transport layer security (TLS) protocol, or at the application level, using the secure socket layer (SSL) protocol. However, none of the above security protocols can provide high security for multidestination transmission, i.e. for simultaneous transmission of IP packets to a multiplicity of addressees.

Thus scrambling using the Digital Video Broadcasting Return Channel via Satellite (DVB-RCS) protocol does not offer high security and the IPSec protocols at the IP level, the TLS protocols at the transport level and the SSL protocols at the application level are suitable only for point to point security, i.e. security between two addressees, and not for security within a group, i.e. involving a multiplicity of addressees.

In this application, the terminals communicate with each other by wireless transmission, for example via satellite, and each send/receive terminal is associated with an encryption and decryption unit adapted to encrypt the information sent by radio and to decrypt information received by radio.

In a preferred embodiment, which applies regardless of the network type, the server authenticates the encryption and decryption units associated with each terminal in addition to its function of distributing encryption and decryption keys.

In one embodiment, IP packets sent by a terminal are transmitted in tunnel mode, i.e. each encrypted IP packet is encapsulated within another packet, which protects not only the data itself but also the headers, including the source and destination addresses, for example.

In one embodiment, the encryption and decryption unit associated with each terminal is a unit separate from the terminal. Alternatively, the unit is implemented in software within the IP stack of the terminal.

In one embodiment, each unit associated with a network terminal includes a first selector for determining if the data to be sent must be encrypted or not and a second selector for determining if the data received must be decrypted or not.

The selectors and encryption and decryption are preferably controlled in a control plane separate from the data plane.

Alternatively, other formats or standards are used instead of IP packets, such as Asynchronous Transfer Mode (ATM), Ethernet, Multi-protocol label switching (MPLS—see the Internet Engineering Task Force (IETF) standard), point to point protocol (PPP), or point to point protocol over Ethernet (PPPoE).

The invention relates generally to a telecommunications system including a plurality of terminals divided into groups such that within each group each terminal can send multidestination messages to the other members of the group, in which system each terminal of a group is associated with encryption and decryption means so that each terminal can send multidestination messages that can be decrypted only by the other terminals of the group, and the system includes a central server for distributing keys to each encryption and decryption means for secure transmission of communications within each group.

The messages are transmitted in accordance with a network protocol, for example. In one embodiment, the network protocol is chosen from the group comprising the following protocols: IP, ATM, MPLS, Ethernet, Packetized Ensemble Protocol (PEP), PPPoE.

In one embodiment, the terminals are connected to a terrestrial cable network and supply the decrypted messages to the cable network.

In one embodiment, the terminals are interconnected by a broadcast network, for example a radio broadcast network, in particular via satellite, or a local area network, for example an Ethernet network. The terminals are preferably adapted to supply encrypted messages to the broadcast network or to the local area network. The central server is connected to the terminals by the broadcast network, for example.

The invention also concerns an encryption and decryption device that includes an interface for receiving and sending encrypted messages via a first telecommunication network, an interface connected to a second network to receive therefrom messages to be encrypted and transmitted via the first network and to deliver to said second network decrypted messages from the first network, and an interface for receiving encryption and decryption keys from a server, the encryption keys being used to encrypt a multidestination message to selected addressees forming part of the same group of the terminal with which the device is associated.

The device is preferably such that the first network is a radio or cable network, in particular a satellite network, and the second network is a cable network.

In one embodiment, the control plane and the data plane of the device are separate.

In one embodiment, the messages are network protocol packets. In this case, the device preferably includes means for sending secure IP packets in tunnel mode. One embodiment of the device includes means for transmitting encrypted IP packets with a first header relating to routing and addressing and a second header relating to the security data of the packet.

One embodiment of the device that includes means for sending secure IP packets in tunnel mode further includes means for sending and receiving second headers with security data from the group comprising: identification data enabling the receiver(s) to determine the functions and keys to be used to return each packet to its original form and to verify its integrity and its source, data relating to the segmentation of the packets, data relating to the service life of the session keys, and a packet number.

In one embodiment, the interface for connecting the device to the first network is connected directly to an interface of a terminal of the network.

As an alternative to this, the device takes the form of software integrated into the network software stack of a terminal of the first network.

The invention finally relates to a server for a telecommunication system for transmitting and receiving multidestination messages, which server includes means for transmitting security elements to each multidestination message sender and receiver such that each sender can encrypt the multidestination messages and each receiver can decrypt the messages received so that all the addressees in a group can receive the encrypted messages simultaneously.

The messages are preferably network protocol packets.

One embodiment of the server includes means for connection to a network for secure confidential transmission of the security elements to each message sender and receiver in a single-destination and/or multidestination mode. The security elements to be transmitted are from the group comprising, for example: functions and keys to be used to protect packets, i.e. to encrypt, decrypt and authenticate packets, or to modify packets, packet encapsulation formats, in particular IP formats, filter data defining the packet destination group, and data relating to the service life of the security element.

The security functions and the modifications made to the network packets are preferably separate and form strung units. In this case, one embodiment of the server includes means for eliminating, adding or replacing at least one unit. The strung units are from the group comprising, for example: the Encapsulating Security Payload Internet Protocol Security (ESP IPSec) protocol, the Authentication Header Internet Protocol Security (AH IPSec) protocol, encryption, authentication, tunnel mode, a spoofer Transmission Control Protocol (TCP) protocol, a proxy Internet Group Management Protocol (IGMP) protocol, and a Drop protocol.

One embodiment of the means for transmission from the server to the senders and receivers includes means such that, during a first phase, the server communicates with the senders and receivers by means of single-destination messages for the purpose of mutual authentication and setting up an encrypted tunnel. In this case, the server preferably includes means such that during a second phase it can send each sender and receiver configuration messages in single-destination mode. The server can also include means whereby, during another phase, it can send multidestination configuration messages to a plurality of senders and receivers.

The server preferably includes means for making the sending of security elements to each sender and receiver of multidestination or single-destination messages reliable.

Such means include means for transmitting again a message not acknowledged by its addressee after a predetermined time, for example.

In one embodiment of the server the security elements are sent to each sender/receiver by means of a multidestination message and each destination sender/receiver is associated with a predetermined acknowledgement time, which differs from one addressee to another, so that the server does not receive a plurality of negative acknowledgement signals simultaneously.

One embodiment of the means for making the sending of security elements to each sender and receiver of multidestination or single-destination messages reliable includes means for associating a sequence number with each message and means for receiving acknowledgement messages including the sequence numbers of the corresponding sent messages and for sending again messages corresponding to sequence numbers that have not been acknowledged.

Alternatively, the means for making the sending of security elements to each sender and receiver of multidestination or single-destination messages reliable include, for multidestination messages, means for detecting negative acknowledgements from senders/receivers indicating that they have not received messages for, a given sequence number and means for transmitting again messages corresponding to the negative acknowledgements.

Other features and advantages of the invention will become apparent from the following description of embodiments of the invention given with reference to the accompanying drawings.

BRIEF DESCRIPTION OF THE DRAWINGS

FIG. 1 is a diagram of a telecommunication system according to the invention.

FIG. 2 is a diagram of an encryption and decryption device according to the invention.

FIG. 3 shows one application of the device shown in FIG. 2.

FIG. 4 shows a variant use of the device shown in FIG. 2.

FIG. 5 is a diagram showing a packet encrypted by the FIG. 2 device.

FIG. 6 shows one example of exchanging security messages.

FIG. 7 is a diagram analogous to that of FIG. 6, for another phase of exchanging messages.

FIG. 8 is also a diagram analogous to that of FIG. 6, for a further phase of exchanging messages.

DETAILED DESCRIPTION OF THE PREFERRED EMBODIMENTS

The embodiment of the invention described with reference to the figures relates to a satellite telecommunication network connected to a terrestrial network. The networks transport Internet Protocol (IP) packets.

The satellite telecommunication network includes terrestrial terminals 12, 14, 16, 18, etc. for sending and receiving in accordance with the Internet Protocol. The packets sent and received pass through receiver and retransmitter equipment units on board a satellite 20 of any geostationary or non-geostationary type.

The packets, sent by each terminal 12 are single-destination or multidestination packets. The term "single-destination" refers to the fact that a terminal sends a message to only one other terminal. The term "multidestination" refers to the fact that a terminal sends a message to a plurality of other terminals. Some multidestination communication is not addressed to all the terminals in the coverage area of the satellite, but only to terminals within the same group. Data addressed to selected terminals is therefore encrypted.

To this end, each terminal 12, 14, etc. is allocated an encryption and decryption unit $12_1$, $14_1$, etc., which can take the form of a unit separate from the terminal 12, as shown here.

Alternatively, the encryption and decryption units are integrated into the satellite terminal software (this is not shown in FIG. 1). The encryption and decryption mechanisms and the other functions of the units $12_1$, $14_1$, etc. can in this case be integrated into the IP stack of the terminals 12, 14.

The following description refers mainly to the situation shown, i.e. that in which encryption and decryption units $12_1$, $14_1$, etc. are separate from the terminals 12, 14, etc.

The units $12_1$, $14_1$ are managed by a master unit $16_1$ (server) whose function is to authenticate the units $12_1$, $14_1$, $16_1$, $18_1$, etc., referred to as client units, and to distribute to them all the information they need relating to the security level decided on for the transmission of data for the group comprising the associated terminals and units, i.e. all of the information needed for data supplied by one member of the group to be understandable only to other members of the group.

The set of parameters to be supplied to each unit is referred to as a "security association" and the parameters are distributed to each new unit after verifying its identity.

The IP packets sent by one member of the group are encrypted by the unit $12_1$, $14_1$, etc. where they enter the satellite communication network 20. The packets can be received by all of the terminals in the field of the satellite, but can be decrypted only by the various other members of the group, using their corresponding units.

Transmission in the satellite network can be in tunnel mode, in which an IP packet containing data and a header is encrypted in its entirety and the encrypted packet forms the data portion of a new packet, to which a header is added. The exact type of processing that is applied to the packet is described in the security association. It is possible not only to encrypt the packet in its entirety but also to modify the IP fields.

Clearly the invention can use a satellite transmission network architecture without modifying it.

FIG. 2 is a block diagram showing the structure of the unit $12_1$.

The unit includes a first selector 30 which receives data from the terrestrial network 24 and supplies the data either directly to the satellite network $20_1$ (via connection 32) if there is no encryption or via an encryption unit 34.

The unit $12_1$ includes a second selector 36 receiving data from the satellite network $20_1$ and supplying data to the terrestrial network 24 either directly via the connection 38 or via a decryption unit 40.

The selectors 30 and 36, the encryption unit 34 and the decryption unit 40 receive control data from a command or control plane 42.

FIG. 3 shows an embodiment in which the protocols used by the units $12_1$, $14_1$, etc. are Ethernet protocols (eth0, eth1), transmission occurring in the physical layer, i.e. at the level of an Ethernet frame, without ascending to the IP layer.

Thus all Ethernet frames are captured by the client units and the packets are extracted from them, possibly encrypted, as explained above, and then reintroduced into the frame before they are transmitted to the satellite network $20_1$.

Frames coming from the network $20_1$ are subjected to the opposite processing, after verifying their integrity.

Each client unit has a specific IP address that is used to communicate with the master unit and to authenticate it to the master unit so that it can receive the security association parameters. The IP address is also useful for renewing keys.

FIG. 4 shows the encryption and decryption unit when it consists of software in the satellite terminal.

The data coming from the satellite network is supplied to an interface module 50 which transmits the data to a module 52 for de-encapsulating IP packets. The de-encapsulated IP packets are supplied to a unit 54 containing selector and decryption modules having the same function as the units described with reference to FIG. 2. The data from the block 54 is supplied to the IP layer 56 via an interface 58 with the IP layer.

The data from the IP layer is transmitted to the terrestrial network, routed with the aid of interfaces $60_1$, $60_2$ and transmitted to respective interfaces $62_1$, $62_2$.

The interfaces are bidirectional, of course.

Regardless of the form in which the client and master units are implemented, their most important function is providing security services.

Thus the client and master units firstly protect and secure IP communications. The confidentiality of the traffic is assured by encrypting the data and the headers of the IP packets and by using tunnel mode transmission in the satellite network $20_1$.

Each client unit includes means for verifying the integrity of the data, i.e. for verifying if each IP packet received has been modified, whether accidentally or intentionally.

Each client unit can also authenticate the source of the data, i.e. verify that each IP packet comes from a member of the group.

Finally, the units can prevent replaying. To this end each packet is assigned a unique integer sequence number. Thus if a packet is sent by a third party outside the group, the replayed packet will have a number that does not match the other packets.

The master unit $16_1$, includes means for authenticating units.

Generally speaking, the master unit provides centralized management of the keys used by each client unit to secure IP traffic. Thus the master unit generates, distributes and renews keys.

The master unit and the client units can be organized so that a plurality of security levels can be defined in the same group. For example, if a user group comprises all the members of a company, it is possible to distinguish head office staff from the staff of each subsidiary, characterized by their network addresses.

It will be noted that the data protection services, namely the traffic confidentiality service, the data source authentication service, and the data integrity verification service, can be used separately or in combination.

Thus it is possible to provide the traffic confidentiality service without verifying the authenticity of the data source or the integrity of the data. For a higher degree of security the traffic confidentiality service is combined with authentication of the data and/or verification of the data integrity. Likewise, the data source can be authenticated and/or the data integrity verified without providing the traffic confidentiality service.

A control plane is defined for controlling the data that includes means in each master unit and in each client unit.

The master unit constitutes a central server for managing the client units and includes a database of client units authorized to access data that must be exchanged within the group.

Each client unit is listed in the database with a unique logical identifier and a secret data item which is known only to the master unit and the client unit concerned and is used for authentication. The database also includes a list of identifiers of security associations that each client unit is authorized to access.

The main parameters of the security association database are:
  filtering parameters, defining the addressee group,
  parameters of security association functions, namely:
  the type of security association that defines the IP packet encapsulation format,
  transmission in pure tunnel mode or in transport tunnel mode with the IP address of the addressee(s) (according to whether transmission is single-destination or multi-destination),
  an authentication function that includes the following options: no authentication, an Keyed-Hash Method Authentication Code Secure Hash Algorithm 1 (HMAC-SHA1), HMAC-Response Desired 5 (RD5), etc. function; the parameters of the authentication function are the key to be used and the length and service life of the key,
  the encryption function, which can include the following options: no encryption, Triple Data Encryption Standard Electronic Code Book (3DESECB), Triple Data Encryption Standard Cipher-Block Chaining (3DESCBC), etc.; the encryption function also includes as parameters the key to be used, its length and its service life, and
  the expiry date of the security association, which is linked to the service life of the keys, of course.

In this example of a control plane, each client unit includes a memory card, for example a microprocessor card, whose memory contains the logical identifier of the unit, the secret key shared only with the master unit, an IP address and a parameter defining the unit as a network element.

Before a client unit is authorized to receive and send IP packets in a secure manner, a connection is set up between the client unit and the master unit in order to start a preliminary authorization session referred to as phase 1 (FIG. 6), after which the master unit sends configuration information in single-destination mode (phase 2—FIG. 7) and/or in multi-destination mode (phase 2a—FIG. 8). This information is exchanged via the satellite network.

During phase 1 (FIG. 6), the client unit and the master unit authenticate each other, for example using a shared key. Thus the master unit can verify the identity of the client unit and determine if it is authorized to access the security associations of the group to which it belongs and the client unit can verify that it is really dealing with the master unit.

During phase 1 (FIG. 6), a secret common key is generated, for example a Diffie-Hellman key, and is then used for secure transmission of the tables or parameters of the security association of the group.

The first phase of the IETF standard Internet Key Exchange (IKE) can be used for phase 1, either in principal mode (as shown in FIG. 6) or in aggressive mode.

The principal mode carries out mutual authentication by means of shared keys and generates a secret common key.
  The aggressive mode also carries mutual authentication using shared keys and generates a secret common key. In the aggressive mode, phase 1 is carried out faster than in the principal mode. The aggressive mode does not protect the identities of the master and client units.

In this way a secure tunnel is set up between each client unit and the master unit. It is only after these exchanges have been completed that all of the security association parameters to be used to secure the IP packets addressed to the user group (inclusive of the keys) can be sent secretly to the client unit by the master unit.

The parameters can be transmitted not only by single-destination messages (phase 2—FIG. 7), but also by multi-destination messages (phase 2a—FIG. 8). In the latter case, the master unit sends to a plurality of common units belonging to the same group. This phase is protected by the control security association. It can be used to configure client units or to update their security associations. This phase can be used if numerous client units of the same group set up a connection to the master unit at the same time. In this case, the master unit can send in single-destination mode only the control security association for each client unit and can afterward transmit the security association tables to which they have right of access simultaneously to all the client units.

This multidestination transmission optimizes bandwidth. It can also be used after single-destination transmission to harmonize the security associations of the client units so that the latter are updated at the same time.

After phase 1, in the principal mode or the aggressive mode, the session keys used for encryption and decryption, authentication and verification of the integrity of the IP packets by the client units are therefore distributed by the master unit and then regularly renewed. Either a nominal mode or a degraded mode is used to distribute and renew keys.

The control security association, which is common to all of the client units and received in phase 2 (FIG. 7), is used for key renewal in nominal mode. The control security association protects the session keys. During session key renewal, the master unit can send all authorized client units simultaneously the new keys encrypted with the encryption key of the control security association.
  Because the keys are sent simultaneously to all the units, the nominal mode is particularly suitable if the number of units is large.
  In degraded mode, the session keys are sent to each client unit and are protected for each client unit by the secure tunnel to the master unit set up in phase 1 (FIG. 6). The degraded mode therefore uses one by one transmission. It differs from the nominal mode in that it does not use the control security association.

The data plane includes the IP packet format, the headers of the various packet types, and the functions and algorithms used.

FIG. 5 shows a conventional IP packet which includes a data portion 70 and an IP header portion 72.

As indicated above, for secure transmission of packets in the network $20_1$ the tunnel mode is used in which a new IP packet is created from the original packet and the original packet is secured, i.e. its header and its data are encrypted.

As shown in FIG. 5, the packet 70, 72 is encrypted to form the packet 74 to which are added an IP' header 76 for addressing and routing and an IPSec header 78 for securing the data to be transmitted and which is also needed to decrypt it.

Transmission can be in pure tunnel mode, in which case the source IP address of the new IP packet is the IP address of the sender unit and the destination IP address is that of the destination unit(s). In other words, the IP addresses of the original source and the final addressee can be hidden in this case.

It is also possible to use the transport tunnel mode in which the addresses of the source and the destination of the IP packet formed for the purposes of transportation are those of the original packet.

The IPSec header 78 dedicated to the security mechanisms and functions applied to the original IP packet can include one or more of the following fields:

An identifier of the security association applied to the packet. This field enables each unit to identify, for a received IP packet, the functions and the keys to be used to return it to its original form.

An authentication field that supplies a value resulting from the application of a hashing function to the packet 74, 76, 78.

A parameter indicating the length of the packet and if it was segmented before it was transmitted in tunnel mode. In this case, the parameter indicates if the segment is the first or last segment or an intermediate segment. This field enables the receiving unit to assemble the original packet.

The service life of the security association with its start and end dates. This field indicates if a new session key is being used or if the current key is reaching the end of its life.

A counter that is incremented for each IP packet sent. The number allocated to each packet in this way prevents replaying. If a plurality of sources are adapted to send IP packets, each source has its own counter and the receivers can then identify the source of the IP packet with the source IP address.

The functions and algorithms used are, for example, those of the IPSec standard protocol, i.e. the CBC mode 3DES protocol for encrypting the data and hashing functions such as the HMAC-Message Digest Algorithm 5 (MD5) function or the HMAC-SHA function for verifying the integrity, authenticity and source of a packet.

The encryption algorithm is applied to the original IP packet, i.e. to the headers and the data.

For authentication, the hashing functions are applied to the whole of the packet, i.e. to the IP' header, to the IPSec header and to the secure data. In this way it is possible to detect any modification to the parameters referred to in clear that are essential for the receiver to be able to decrypt the packets, to carry out the various verifications, and to reassemble the original packet.

Generally speaking, the encapsulation of the IP packets depends on the security associations defined for the packet traffic. It is therefore possible to use the encapsulation defined above, the standard IPSec AH/ESP encapsulations, or an IP in IP encapsulation. It is also possible to modify the IP packet, which can be sent without encapsulation.

Regardless of the embodiment, the invention provides a simple way to secure multidestination or single-destination data transmitted in accordance with the IP protocol by a radio system, for example, and more particularly by a satellite system. It is suitable for virtual private networks (VPN).

The cost of installing and producing the various equipment units is moderate.

In one embodiment the various session set-up phases are made reliable to assure that all of the configurations sent by the master unit are implemented in the destination units and to assure that key renewals and updates are applied in all of the client units.

For phase 1 (FIG. 6), during which messages are exchanged in a predetermined order, reliability is assured by imposing the following constraints: only one message is sent at a time; the order of the messages is fixed, and each sending is associated with a time-delay: if the next message is not received before the end of the time-delay the message is transmitted again.

FIG. 6 is a diagram showing one example of the exchange of messages for phase 1 between a master unit and a client unit. The figure shows six messages for mutual authentication of the master unit and the client unit and setting up an encrypted tunnel. In this example, these messages use the IKE protocol, to be more precise the Request for Comments (RFC) 2408 standard protocol Internet Security Association and Key Management Protocol (ISAKMP). Lines 1 to 6 of FIG. 6 use the ISAKMP formalism. Accordingly:

HDR is a generic header followed by data.
SA is a security association.
P is a proposition.
T is a transformation.
KE is an exchange of keys.
NONCE is a random value.
HASH is a hashing value.
IDi is an identifier.
SEQ is a sequence number.
SIG is a digital signature.
HDR* signifies that all of the data of the message is encrypted.

During the second phase (phase 2), shown in FIG. 7, the server sends each client unit configuration messages in single-destination mode. The number of configuration messages varies according to the session. To guarantee the reliability of this second phase, an acknowledgement procedure is provided, based on a sequence number present in one of the fields of the message, and unacknowledged messages are retransmitted.

In this example, the acknowledgements are selective: the receiver specifies the sequence number of messages already received. Thus the client unit periodically sends an acknowledgement message indicating the sequence number up to which it has received all messages. For example, if the client unit has received correctly the sequence numbers from 1 to 9 and from 11 to 15, it sends an acknowledgement mentioning this and the master unit knows that it must send the message corresponding to the missing sequence number 10 again. This being so, because the acknowledgement comes when other messages have already reached the client unit, selective acknowledgement limits the resending of messages to those that have not been received. As for the first phase, any message that is not acknowledged during its time-delay is transmitted again.

Phase 2 constitutes a phase of updating the client units relative to the units already connected and provides instructions for encrypting packets. In the example shown in FIG. 7, the ISAKMP protocol is used, with the same formalism.

However, lines 1, 2 and 6 carry an indication SA/P/T IPSec that corresponds to the sending of data specific to the invention. Thus the part of the data in lines 1 and 2 contains $n_1$Param and $n_2$Param which signify "$n_1$ parameters" and "$n_2$ parameters", and these parameters correspond to those of functional units in each security association (see below).

Line 6 includes control parameters.

The suffix ack, for example as in SEQ_ack, means an SEQ (sequence number) acknowledgement.

In phase 2a (FIG. 8), the master unit sends multidestination configuration messages to a plurality of client units. To make this phase reliable, a negative acknowledgement with retransmission is used, i.e. a client unit that has not received a message asks for it to be transmitted again by sending a negative acknowledgement message. Each message again includes a sequence number. Each client unit knows the first sequence number that the master unit will use and the master unit regularly sends a message indicating the last sequence number it has used. If a client unit finds that it has not received one or more messages it starts a time-delay. At the end of this time-delay the client unit sends a negative acknowledgement message indicating the missing sequence numbers, which instigates retransmission of the corresponding messages in multidestination mode.

In other words, unlike selective acknowledgements, during the single-destination phase 2, during this multidestination phase 2a the client units do not send acknowledgements systematically. It is only if a sequence number is missing that the client unit sends a negative acknowledgement. This limits the traffic from the client units to the master unit.

To prevent congestion of the master unit the time-delay can be different from one client unit to another.

FIG. 8 shows an example of messages sent by the master unit in multidestination mode and a message (line 5) sent by one of the client units to the master unit.

In this figure, each line has the same meaning as in FIGS. 6 and 7. However, the suffix Nack corresponds to a negative acknowledgement (see above) and HDR** signifies that the encryption of all of the data of the message corresponds to another key and/or an encryption algorithm different from that used for phase 1 or phase 2 (FIGS. 6 and 7).

In one embodiment the secure protocol offers additional functions and services compared to the standard IPSec protocol.

In the prior art IPSec protocol, a security association is used only to define the parameters used to secure IPSec packets. Thus the IPSec protocol constitutes a single functional unit for protecting streams of data. No parameter can be modified during the use of this unit, except for the keys, which are renewed regularly. If the user wishes to modify a characteristic of the security association, it must be renegotiated.

In one embodiment of the protocol according to the invention supplementary services are defined in each security association and constitute separate functional units that are strung together.

Although in the IPSec protocol compression, encryption and authentication form a single functional unit, it is possible in accordance with the invention to separate compression from IPSec encryption.

The functional units that can be included in each security association constitute the following group, for example: the ESP IPSec encryption protocol (defined by the standard RFC 2406), the AH IPSec authentication protocol (defined by the RFC 2402 standard), encryption, authentication, tunnel mode, a "spoofer" TCP protocol (modifications of TCP packets that prevent bit rate limitations associated with the satellite transmission time), a proxy IGMP protocol (modification of Internet Group Management Protocol (IGMP) packets to optimize traffic on the satellite link), and a Drop protocol (filter based on a description of packets and passing only packets having an authorized template).

The stringing of the functional units makes the protocol flexible. Thus during the use of a security association it is possible to modify the parameters of the string by eliminating a unit, adding a unit, or replacing one unit with another.

There is claimed:

1. A telecommunication system including a plurality of terminals divided into groups and connected to a first telecommunication network, such that within a first group each terminal of said first group is configured to send multidestination messages to other terminals of said first group, wherein each terminal of said first group is associated with an encryption and decryption device so that each terminals of said first group is configured to send multidestination messages via the first telecommunication network that can only be decrypted by the other terminals of said first group, wherein said plurality of terminals are connected to a terrestrial cable network and are configured to supply messages received from said first telecommunication network and decrypted by the respective encryption and decryption device to said cable network, and further configured to supply messages received from said cable network and encrypted by the respective encryption and decryption device to said first telecommunication network, and the system further including a central server configured to distribute encryption and decryption keys to each encryption and decryption device for secure transmission of communications within each group.

2. The system claimed in claim 1, wherein the multidestination messages transmitted are transmitted in accordance with a network protocol.

3. The system claimed in claim 2, wherein said network protocol is chosen from the group comprising the following protocols: IP, ATM, MPLS, Ethernet, PEP, PPPoE.

4. The system claimed in claim 1, wherein said plurality of terminals are interconnected by a broadcast network via satellite, or a local area network.

5. The system claimed in claim 4, wherein said plurality of terminals are configured to supply encrypted messages to said broadcast network or to said local area network.

6. The system claimed in claim 4, wherein said central server is connected to said plurality of terminals by said broadcast network.

7. The telecommunication system claimed in claim 1, wherein the central server transmits security elements to each multidestination message sender and receiver such that each sender is configured to encrypt said multidestination messages and each receiver is configured to decrypt the multidestination messages received so that a plurality of addressees in a group can receive the received encrypted messages simultaneously.

8. The telecommunication system claimed in claim 7, wherein said multidestination messages are network protocol packets.

9. The telecommunication system claimed in claim 7, wherein the telecommunication system is connected to a network for secure confidential transmission of said security elements to each message sender and receiver in a single-destination and/or multidestination mode.

10. The telecommunication system claimed in claim 9, wherein the security elements to be transmitted are from the group comprising: functions and keys to be used to protect or to modify packets, packet encapsulation formats, filter data defining the packet destination group, and data relating to the service life of the security element.

11. The telecommunication system claimed in claim 10, wherein said security functions and modifications made to said network packets by said functions are separate and form strung units.

12. The telecommunication system claimed in claim 11, wherein the telecommunication system eliminates, adds, or replaces at least one unit.

13. The telecommunication system claimed in claim 11, wherein said strung units are from the group comprising: the Encapsulating Security Payload Internet Protocol Security (ESP IPSec) protocol, the Authentication Header Internet Protocol Security (AH IPSec) protocol, encryption, authentication, tunnel mode, a spoofer Transmission Control Protocol (TCP) protocol, a proxy Internet Group Management Protocol (IGMP) protocol, and a Drop protocol.

14. The telecommunication system claimed in claim 7, wherein during a first phase of transmitting security elements to each multidestination message sender and receiver, said server communicates using single-destination messages with said senders and receivers using single-destination messages for the purposes of mutual authentication and setting up an encrypted tunnel.

15. The telecommunication system claimed in claim 14, wherein during a second phase of transmitting security elements to each multidestination message sender and receiver, configuration messages are sent to each sender and receiver in single-destination mode.

16. The telecommunication system claimed in claim 14, wherein multidestination configuration messages are sent to a plurality of senders and receivers during another phase.

17. The telecommunication system claimed in claim 7, wherein successful transmission of security elements to each sender and receiver of multidestination or single-destination messages is ensured.

18. The telecommunication system claimed in claim 17, wherein successful transmission of security elements to each sender and receiver of multidestination or single-destination messages is ensured by transmitting again a message not acknowledged by its addressee after a predetermined time.

19. The telecommunication system claimed in claim 18, wherein said security elements are sent to each sender/receiver using a multidestination message and each destination sender/receiver is associated with a predetermined acknowledgement time, which differs from one addressee to another, so that said server does not receive a plurality of negative acknowledgement signals simultaneously.

20. The telecommunication system claimed in claim 17, wherein successful transmission of security elements to each sender and receiver of multidestination or single-destination messages is ensured by associating a sequence number with each message.

21. The telecommunication system claimed in claim 20, wherein successful transmission of security elements to each sender and receiver of multidestination or single-destination messages is ensured by receiving acknowledgement messages including the sequence numbers of corresponding sent messages and for sending again messages corresponding to sequence numbers that have not been acknowledged.

22. The telecommunication system claimed in claim 20, wherein successful transmission of security elements to each sender and receiver of multidestination or single-destination messages is ensured by, for multidestination messages, detecting negative acknowledgements from senders/receivers indicating that they have not received messages for a given sequence number and transmitting again messages corresponding to the negative acknowledgements.

23. The system claimed in claim 4, wherein said broadcast network is a radio broadcast network.

24. The system claimed in claim 4, wherein said local area network is an Ethernet local network.

25. The telecommunication system claimed in claim 10, wherein said functions and keys to be used to protect packets encrypt, decrypt and authenticate packets.

26. The telecommunication system claimed in claim 10, wherein said packet encapsulation formats are IP formats.

27. An encryption and decryption device associated with a first terminal among a plurality of terminals, the encryption and decryption device including:
an interface connected to a first telecommunication network, configured to receive and send encrypted messages between the first terminal and at least a second terminal from among the plurality of terminals via said first telecommunication network,
an interface connected to a second network, configured to receive messages sent from at least said second terminal, via said second network, wherein messages are to be encrypted by said encryption and decryption device and transmitted by the first telecommunication network to the first terminal, and to deliver to at least said second terminal via the second network, messages received from the first terminal via said first telecommunication network that have been decrypted by said encryption and decryption device, and
an interface configured to receive encryption and decryption keys from a server, said encryption keys being used to encrypt a multidestination message to selected addressees forming part of the same group as said first terminal with which said encryption and decryption device is associated.

28. The device claimed in claim 27, wherein said first network is a radio or cable network or a satellite network, and said second network is a cable network.

29. The device claimed in claim 27, wherein a control plane and a data plane of said device are separate.

30. The device claimed in claim 27, wherein said messages are network protocol packets.

31. The device claimed in claim 30, wherein secure IP packets are sent in tunnel mode.

32. The device claimed in claim 31, wherein encrypted IP packets are transmitted with a first header relating to routing and a second header is addressed relating to security data of said encrypted IP packets.

33. The device claimed in claim 31, wherein second headers are sent and received with security data from the group comprising: identification data enabling a terminal receiving said second headers to determine functions and keys to be used to return each secure IP packet that has been received to its original form and to verify its integrity and its source, data relating to segmentation of said secure IP packets, data relating to the service life of session keys, and a packet number.

34. The device claimed in claim 27, wherein the interface for said connection to said first telecommunication network is connected directly to an interface of a terminal of said second network.

35. A non-transitory computer readable storage medium storing a computer executable program comprising program code configured to carry out the functions of the encryption and decryption device according to claim 27, and is integrated into a network software stack of a terminal of said first telecommunication network.

* * * * *